Aug. 25, 1970     J. R. MILANES     3,525,254
DEVICE AND METHOD FOR TESTING BLOOD COAGULATION FACTORS
Filed Feb. 19, 1969
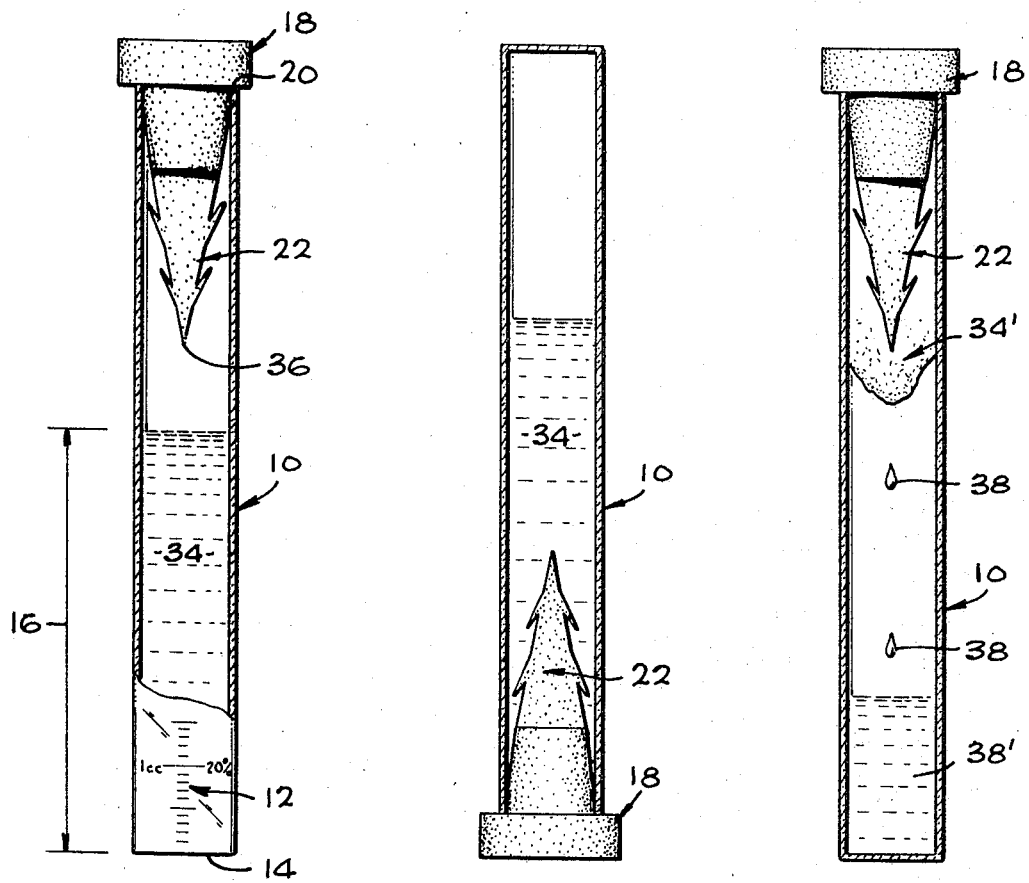
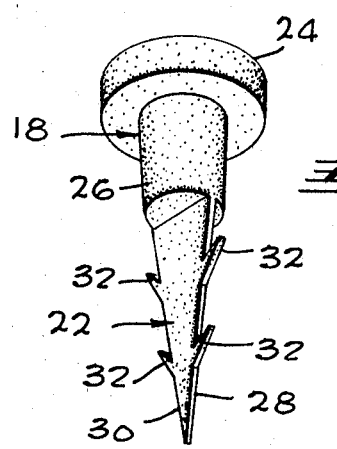
JESUS R. MILANE
INVENTOR.
BY Allan M. Shapiro
ATTORNE

United States Patent Office 3,525,254
Patented Aug. 25, 1970

3,525,254
DEVICE AND METHOD FOR TESTING BLOOD COAGULATION FACTORS
Jesus R. Milanes, Los Angeles, Calif.
(8353 Donna Ave., Northridge, Calif. 91324)
Filed Feb. 19, 1969, Ser. No. 800,612
Int. Cl. G01n 33/16
U.S. Cl. 73—64.1
13 Claims

ABSTRACT OF THE DISCLOSURE

A measured amount of whole fresh blood is placed in a graduated test tube having, at its upper end, a stopper provided with a depending member extending partially into the test tube. Inversion of the tube causes the blood to surround the depending member so that, after a short period of time, the blood is clotted in a mass about the member. Reversion of the tube causes the clotted blood mass to be suspended within the tube via the depending member. Over a period of time, clot retraction and fibrinolysin activity causes release of fluids from the clotted blood and the force of gravity automatically causes the dripping separation of such fluids from the clot and collection of such fluids in the bottom portion of the tube where they are readily measurable. A depending member is disclosed comprising a resilient portion with hook-like barbs for clotted blood retention.

BACKGROUND OF THE INVENTION

Field of the invention

The present invention relates to blood coagulation testing and, more particularly, to a device and method for testing certain blood coagulation rate factors, namely, clot retraction and fibrinolysin activity rates.

Briefly, the clotting of blood involves a sequence of complex chemical and physical reactions that results in conversion of fluid blood into a coagulum. With the passage of time, the clotted blood releases serum, i.e., the watery portion of the fluid blood remaining after coagulation, and red blood cells, the release of the latter being due to fibrinolysis or fibrinolysin activity, i.e., the enzymatic or other breakdown of fibrin which is an insoluble fibrous protein formed in the clotting of the blood. It is medically important to be able to separate the plasma, i.e., serum and fibrinogen, and measure it as it is released from the blood clot so as to be able to determine the rate of clot retraction and fibrinolysin activity.

Description of the prior art

In the past, there have been various devices for separating one or more components from blood. However, none of these devices is capable of providing reliable and accurate quantitative measurements of clot retraction and fibrinolysin activity rates.

SUMMARY OF THE INVENTION

In accordance with the present invention, there is provided a test tube device for use in testing blood clot retraction and fibrinolysin activity rate comprising an invertible cylindrical transparent elongated test tube adapted to receive a measurable quantity of fluid blood when the tube is in an upright position, a removable stopper adapted for closure of the open upper end of the tube, and a clot retention member fixedly extending from the stopper for partial insertion into the interior of the tube in effectively coaxial relationship therewith whereby, upon inversion of the assembled device, the fluid blood surrounds the member and forms a blood clot in engagement with the member and, upon revision of the device to an upright position, the member suspends and retains the clot to permit gravity separation of fluids therefrom for collection of the fluids in the bottom of the tube. Preferably, the member and stopper are unitarily formed of a resilient material, such as rubber, whereby the formation of the clot causes a squeeze-like resilient deformation of the member so that the latter tends to resiliently expand against the clot during the fluid separation condition for improved retention of the solids portion of the clot. Preferably, the member has a substantially planar configuration in parallel with the sidewall of the tube and has a pair of opposite longitudinal edges in downwardly converging relationship to each other which are provided with a plurality of lateral barbs projecting therefrom and angled upwardly as when viewed in the upright position whereby improved retention of the clot solids is attained via the hook-like engagement of the barbs with the blood clot. Preferably, the tube is provided with graduated measurement indicia progressing upwardly from the closed bottom end of the tube and indicating the quantity of the tube contents in either or both of volume and/or percentage.

Accordingly, the primary objects of the present invention are to provide a device and method for testing blood coagulation factors, with particular reference to clot retraction and fibrinolysin activity rate.

Still other objects, features and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts in the several figures.

BRIEF DESCRIPTION OF THE DRAWINGS

FIG. 1 is a side elevational view, partly broken away and sectioned, of a blood testing device in accordance with the present invention, illustrated as containing a measured quantity of fluid blood;

FIG. 2 is a side elevational view of the device in the inverted position;

FIG. 3 is a side elevational view of the device in the reverted position, illustrating the dripping separation of fluids from the clotted blood and the collection of such fluids; and FIG. 4 is a perspective view of a preferred stopper and clot retention member as illustrated in FIGS. 1–3.

DESCRIPTION OF THE PREFERRED EMBODIMENT

Referring to the drawings, there is seen a test tube 10 preferably composed of glass and having graduated indicia thereon as indicated at 12 which progress from a zero value at the flat bottom 14 of the tube 10 up to any desired value but preferably 5 cc. or ml. at a height corresponding to approximately one-half of the capacity of the tube 10 as indicated by measurement line 16, whereby a plurality of such devices may be simultaneously used in a test procedure with identical quantities of fluid blood for purposes of comparative values and measurements.

A stopper 18 is provided for closure of the open upper end 20 of the tube 10. A clot retention member 22 fixedly extends centrally downwardly from the stopper 18 so as to be spaced from and parallel to the sidewall of the tube 10. As best seen in FIG. 4, the preferred stopper 18 and clot retention member 22 are unitarily formed of a resilient material such as, for example, neoprene, rubber or the like, and the stopper 18 includes a circular cap portion 24 for manual gripping and a reduced diameter conical plug portion 26 which is downwardly inwardly tapered for positive sealing engagement interiorly of the tube 10. The member 22 has a downwardly inwardly tapered or converging pair of opposite edges 28 and 30 on its planar body. A plurality of hook-like barbs, such as at 32, angularly project outwardly and upwardly from the edges 28 and 30.

In FIG. 1, a measured quantity of whole fluid blood, indicated at 34, is seen disposed in and contained by the tube 10, preferably approximately half-filling the tube 10 to the 100% or 5 cc. marker which is below the lower extremity 36 of the member 22. In FIG. 2, the device has been inverted so that the blood 34 rests on and surrounds the clot retention member 22, while the stopper 18 prevents escape of the blood 34. As the blood 34 clots into its solid state, it assumes a somewhat irregular and compressed shape as indicated at 34' in FIG. 3 and grips the member 22 relatively tightly, causing resilient deformation thereof.

Upon reversion of the device into its upright position as illustrated in FIG. 3, the clot 34' is retained by member 22 and suspended within the tube 10 so that fluids released from the clot 34' by virtue of clot retraction and fibrinolysin activity are separated from the clot 34' via the force of gravity and permitted to drip, as at 38, for collection at the bottom of the tube as a measurable quantity of fluids 38'.

As release and separation of the fluids 38 from the clot 34' proceeds, the structural integrity of the clot 34' diminishes so that it would have a tendency to slip off the retention member 22. However, the resiliently deformed or compressed member 22 tends to return to its original static shape and applies an outward force against the clot 34' for maintaining retention engagement therewith. Similarly, the barbs 32 are effectively embedded in the clot 34' and provide a hook-like action for suspension retention of the clot 34'.

In practicing the method of the present invention for measuring clot retraction and fibrinolysin activity rate, the device is preferably refrigerated or otherwise cooled while in the inverted position of FIG. 2 until the clot is formed which, with the preferred 5 cc. quantity of initial blood, takes about twenty minutes. Then the device is immediately reverted to the position of FIG. 3 and preferably placed in a water bath maintained at 37° F. for a selected period of time. The serum, i.e., the watery portion of the fluid blood released by the coagulation itself, immediately commences separation by dripping from the clot 34'. As fibrinolysis occurs, i.e., the subsequent breakdown of the fibrin formed during coagulation, red blood cells are released and similarly separated from the clot 34' by gravitational dripping with the serum. Volumetric or direct percentage measurements of the amount of serum and red blood cells as fluids 38' collected in the tube 10 after specified periods of time, say, in the order of twenty-four hours, has produced significant comparative and individual information on clot retraction and fibrinolysis activity rates pertinent to blood coagulation factors. It should be noted that the red blood cells will separate from the serum by sedimentation and reside at the bottom of the tube 10, with a relatively clearly observable line of demarcation from the clear serum thereabove, so that the respective quantities of serum and red blood cells can be readily determined.

What is claimed is:

1. A test tube device for use in testing blood clot retraction and fibrinolysin activity comprising:
an invertible cylindrical transparent elongated test tube having an open first end and a closed second end for receiving a measurable quantity of fluid blood through said first end when said tube is in an upright position, said tube having a volumetric capacity substantially greater than said measurable quantity of fluid blood;
a removable stopper for closure of said first end; and
a clot retention member fixedly extending from said stopper for partial insertion into the interior of said tube in effectively coaxial relationship therewith and above said fluid blood whereby, upon inversion of the assembled device, such fluid blood surrounds said member and forms a blood clot in engagement with said member and, upon reversion of the device to an upright position, said member suspends and retains such clot to permit gravity separation of fluids gradually therefrom toward said second end for measurable collection of such fluids by said tube below such clot and member.

2. A device in accordance with claim 1 wherein said member is composed of resilient material for resilient deformation thereof by such clot whereby said member tends to resiliently expand against such clot.

3. A device in accordance with claim 2 wherein said member is substantially planar.

4. A device in accordance with claim 3 wherein said member is unitary with said stopper.

5. A test tube device for use in testing blood clot retraction and fibrinolysin activity comprising:
an invertible cylindrical transparent elongated test tube having an open first end and a closed second end for receiving a measurable quantity of fluid blood through said first end when said tube is in an upright position;
a removable stopper for closure of said first end; and
a clot retention member fixedly extending from said stopper for partial insertion into the interior of said tube in effectively coaxial relationship therewith, said member being provided with a plurality of lateral barbs angled upwardly when viewed in said upright position, whereby, upon inversion of the assembled device, such fluid blood surrounds said member and forms a blood clot in engagement with said member and, upon reversion of the device to an upright position, said member suspends and retains such clot to permit gravity separation of fluids gradually therefrom toward said second end for measurable collection of such fluids by said tube.

6. A device in accordance with claim 5 wherein said member is composed of resilient material for resilient deformation thereof by such clot whereby said member tends to resiliently expand against such clot.

7. A device in accordance with claim 6 wherein said member is substantially planar and has a pair of opposite longitudinal edges in downwardly converging relationship to each other, and said barbs project from said edges.

8. A device in accordance with claim 7 wherein said member is unitary with said stopper.

9. A device in accordance with claim 8 wherein said tube is provided with graduated measurement indicia progressing upwardly from said second end and indicating at least one of volume and percentage.

10. A device in accordance with claim 5 wherein said member is substantially planar and has a pair of opposite longitudinal edges in downwardly converging relationship to each other, and said barbs project from said edges.

11. A device in accordance with claim 10 wherein said member is unitary with said stopper.

12. A device in accordance with claim 11 wherein said tube is provided with graduated measurement indicia progressing upwardly from said second end and indicating at least one of volume and percentage.

13. A method for testing blood clot retraction and fibrinolysin activity comprising:
  disposing and containing a measured quantity of fluid blood in a test tube;
  permitting the blood to clot at one end of the test tube;
  disposing the test tube so that the blood clot is at the upper end of the tube;
  suspending the clot while permitting gravity separation from the clot of fluids released therefrom; and
  collecting the separated fluids in the tube at the lower end thereof for quantitative measurement of the collected fluids.

References Cited

UNITED STATES PATENTS

| 1,962,875 | 6/1934 | Reber | 128—269 |
| 2,043,678 | 6/1936 | Schmalz | 128—269 |
| 2,659,920 | 11/1953 | Bogan et al. | 132—73.5 |

LOUIS R. PRINCE, Primary Examiner

J. W. ROSKOS, Assistant Examiner

U.S. Cl. X.R.

23—230; 128—2